(12) United States Patent
Nishimura et al.

(10) Patent No.: US 8,359,835 B2
(45) Date of Patent: Jan. 29, 2013

(54) EXHAUST DEVICE AND VEHICLE WITH EXHAUST DEVICE

(75) Inventors: Hidehiro Nishimura, Shizuoka-ken (JP); Hiromi Suzuki, Shizuoka-ken (JP); Manabu Shimoishi, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 500 days.

(21) Appl. No.: 11/743,044

(22) Filed: May 1, 2007

(65) Prior Publication Data

US 2007/0256409 A1    Nov. 8, 2007

(30) Foreign Application Priority Data

May 1, 2006   (JP) .................................. 2006-127212

(51) Int. Cl.
*F01N 3/00*   (2006.01)
*F01N 1/08*   (2006.01)

(52) U.S. Cl. ............. 60/289; 60/299; 181/269; 181/272

(58) Field of Classification Search ............. 60/299, 60/322, 274, 289–291, 293, 288; 181/227, 181/228, 247, 255, 269, 272
See application file for complete search history.

(56) References Cited

U.S. PATENT DOCUMENTS

| 3,776,366 | A | * | 12/1973 | Betts et al. ............... 181/239 |
| 5,857,327 | A | | 1/1999 | Sato et al. |
| 6,619,426 | B2 | * | 9/2003 | Minami et al. ........... 181/251 |
| 6,763,657 | B2 | * | 7/2004 | Wachi et al. .............. 60/285 |
| 2006/0266024 | A1 | * | 11/2006 | Ishimoto et al. .......... 60/299 |

FOREIGN PATENT DOCUMENTS

| EP | 1640581 A1 * | 3/2006 |
| EP | 1722079 A1 * | 11/2006 |
| JP | 1237089 | 1/2005 |
| WO | WO 2005080764 A1 * | 9/2005 |

OTHER PUBLICATIONS

European Search Report; Application No. EP 07 25 1807; Dated Jul. 20, 2007.

* cited by examiner

*Primary Examiner* — Kenneth Bomberg
*Assistant Examiner* — Audrey K Bradley
(74) *Attorney, Agent, or Firm* — Keating & Bennett, LLP

(57) ABSTRACT

An exhaust device for a vehicle, such as a motorcycle or scooter, includes an exhaust pipe and a muffler. A first end portion of the exhaust pipe is connectable to an engine of the vehicle. A second end portion of the exhaust pipe is located within the muffler. A secondary air induction pipe supplies air to the exhaust pipe and is connected to a portion of the exhaust pipe located within the muffler. Furthermore, at least the portion of the exhaust pipe to which the secondary air induction pipe is connected is linear. A purification tube member for purifying exhaust gas forms a portion of the second end portion of the exhaust pipe.

18 Claims, 7 Drawing Sheets

EXHAUST DEVICE AND VEHICLE WITH EXHAUST DEVICE

RELATED APPLICATION

The present application is based on and claims priority under 35 U.S.C. §119 to Japanese Patent Application No. 2006-127212, filed on May 1, 2006, the entire contents of which is expressly incorporated by reference herein.

BACKGROUND OF THE INVENTION

1. Field of the Invention

The present invention relates to an exhaust device and a vehicle provided with an exhaust device. More particularly, the present invention relates to an exhaust device including an exhaust pipe and a muffler, and a vehicle provide with such an exhaust device.

2. Description of the Related Art

Exhaust devices for vehicles, such as scooters, often include an exhaust pipe and a muffler. For example, such a vehicle and exhaust device is illustrated in Taiwanese Patent No. 237089. The exhaust device includes an exhaust pipe, a muffler connected to the exhaust pipe, and an air supply pipe that is connected to the exhaust pipe. The air supply pipe supplies air to the exhaust pipe. In this exhaust device, an upstream side purification member and a downstream side purification member are provided in the exhaust pipe. A section between the upstream side purification member and the downstream side purification member is formed to have a U-shape that bends with an approximately 180 degree angle. As a result, the flow direction of the exhaust gas that has passed through the upstream side purification member and the flow direction of the exhaust gas that has passed through the downstream side purification member are opposite from one another. In addition, a connection port of the air supply pipe is attached at the U-shaped bent section between the upstream side purification member and the downstream side purification member of the exhaust pipe where the U-shaped bent section is curved to the inside. More specifically, the air supply pipe is attached to the exhaust pipe such that the connection port of the air supply pipe is directed toward the upstream side of the exhaust pipe.

SUMMARY OF THE INVENTION

However, in the exhaust device disclosed in Taiwanese Patent No. 237089, the air supply pipe is attached to the exhaust pipe such that the connection port of the air supply pipe is directed toward the upstream side of the exhaust pipe. As a result, when exhaust gas passes through the exhaust pipe from the upstream side to the downstream side thereof, the exhaust gas is likely to flow into the connection port of the air supply pipe. Accordingly, it is not likely that negative pressure is generated in the connection port of the air supply pipe, which makes it more difficult to supply air from the air supply pipe to the exhaust pipe.

An preferred embodiment of the present invention involves an exhaust device including an exhaust pipe having a first end portion and a second end portion. The first end portion is connectable to an engine of an associated vehicle. The exhaust device also includes a muffler. The second end portion of the exhaust pipe is located within the muffler. An air supply pipe supplies air to the exhaust pipe and is connected to a portion of the exhaust pipe located within the muffler. The portion of the exhaust pipe to which the air supply pipe is connected is substantially linear. A first purification member for purifying exhaust gas forms a portion of the second end portion of the exhaust pipe.

In an exhaust device as described above, because the portion of the exhaust pipe to which the air supply pipe is connected is substantially linear, it is possible to prevent the air supply pipe from being attached to the exhaust pipe such that a connection port of the air supply pipe is directed toward the upstream side of the exhaust pipe. As a result, when exhaust gas passes from the upstream side to the downstream side inside the exhaust pipe, the exhaust gas is inhibited from flowing into the connection port of the air supply pipe. Accordingly, when the exhaust gas passes from the upstream side to the downstream side within the exhaust pipe, negative pressure is likely to be generated in the connection port of the air supply pipe, whereby air is more easily able to flow from the air supply pipe to the exhaust pipe. As a result, it is possible to inhibit hindrance of the supply of air from the air supply pipe to the exhaust pipe.

A preferred embodiment involves an exhaust device as described above, wherein the exhaust pipe is substantially linear between the air supply pipe and the first purification member. With such a structure, as compared to a structure in which the section between the air supply pipe and the first purification member is curved, a reduction in the flow rate of the exhaust gas in the section between air supply pipe and the first purification member is inhibited. As a result, an increase in exhaust gas pressure inside the section between the air supply pipe and the first purification member is inhibited. Accordingly, it is possible to inhibit hindrance of the supply of air from the air supply pipe to the exhaust pipe.

A preferred embodiment involves an exhaust device as described above, additionally including a second purification member for purifying exhaust gas provided located upstream of the portion of the exhaust pipe to which the air supply pipe is connected. When such a structure is adopted, exhaust gas is purified by the first purification member and the second purification member, whereby the purification capability of exhaust device is improved.

A preferred embodiment involves an exhaust device as described above, wherein the first purification member and the second purification member include a catalyst that functions to purify exhaust gas. If such a structure is adopted, the first purification member and the second purification member can purify the exhaust gas efficiently.

A preferred embodiment involves an exhaust device as described above, wherein the exhaust pipe is substantially linear between the first purification member and the second purification member. When such a structure is adopted, as compared to a structure in which the section between the first purification member and the second purification member is curved, a reduction in the flow rate of the exhaust gas in the section of the exhaust pipe between the first purification member and the second purification member is inhibited. As a result, an increase in the exhaust gas pressure inside the portion of the exhaust pipe between the first purification member and the second purification member is inhibited. Accordingly, it is possible to inhibit hindrance of the supply of air from the air supply pipe to the exhaust pipe.

A preferred embodiment involves an exhaust device as described above, wherein the second purification member is located within the muffler. When such a structure is adopted, it is possible to inhibit the second purification member from being cooled by the outside atmosphere, whereby it is possible to reduce the time required to raise the temperature of the second purification member to the temperature at which the exhaust gas is effectively purified (the activation temperature).

A preferred embodiment involves an exhaust device as described above, wherein the second purification member is positioned near an upstream end of a section of the exhaust pipe that is located within the muffler. With such a structure, the second purification member is disposed relatively close to the engine. Accordingly, exhaust gas with a higher temperature is able to flow into the second purification member, whereby it is possible to reduce the time required to raise the temperature of the second purification member to the temperature at which the exhaust gas is effectively purified (the activation temperature).

A preferred embodiment involves an exhaust device as described above, wherein the first purification member and the second purification member are spaced at a predetermined distance apart from one another in a longitudinal direction of the muffler. If such a structure is adopted, the first purification member and the second purification member are not disposed in a row in the direction (the lateral direction) that crosses the longitudinal direction of the muffler. Accordingly, the muffler does not need to be made larger in the direction (the lateral direction) that crosses the longitudinal direction of the muffler.

A preferred embodiment involves an exhaust device as described above, additionally including a separation wall is provided that separates the inside of the muffler into a plurality of regions, and a connection pipe extends through the separation wall that connects two of the regions separated by the separation wall. In such an exhaust device, the second end portion of the exhaust pipe and the connection pipe overlap one another in the longitudinal direction of the muffler. With such an arrangement, the second end portion of the exhaust pipe is disposed away from the air supply pipe in the longitudinal direction of the muffler. Accordingly, heat generated by purification of the exhaust gas by the first purification member provided in the second end portion of the exhaust pipe is inhibited from being transmitted to the section of the exhaust pipe where the air supply pipe is connected. As a result, the pressure of the air at the portion of the exhaust pipe to which the air supply pipe is connected is inhibited from being increased by heat generated by the first purification member. Therefore, hindrance of the flow of air from the air supply pipe into the exhaust pipe is inhibited even more effectively. Moreover, as a result of arranging the second end portion of the exhaust pipe and the connection pipe such that they overlap in the longitudinal direction of the muffler, sound generated by expansion of exhaust gas, when the exhaust gas that has passed through the second end portion of the exhaust pipe expands in one of the regions separated by the separation wall, is inhibited from directly entering the connection pipe. As a result, it is possible to inhibit sound generated by expansion of the exhaust gas from being transmitted to a neighboring region separated off by the separation wall.

A preferred embodiment involves a vehicle that incorporates an exhaust device as described in any of the above paragraphs. Such a vehicle obtains the advantages of the exhaust devices described above that inhibit a hindrance of supply of air from an air supply pipe to an exhaust pipe.

BRIEF DESCRIPTION OF THE DRAWINGS

These and other features, aspects and advantages of the present invention are described below with reference to drawings of preferred embodiments, which are intended to illustrate, but not to limit, the present invention. The drawings contain seven (7) figures.

DETAILED DESCRIPTION OF THE PREFERRED EMBODIMENT

Figure 1:
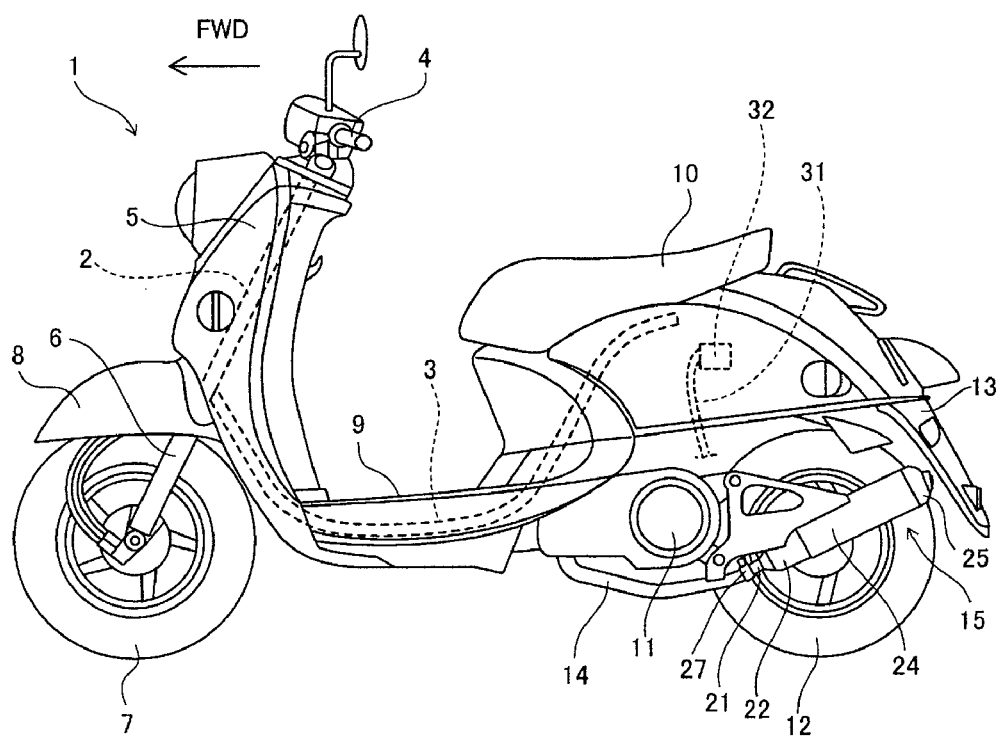
FIG. 1 is a side view of a scooter type motorcycle. The motorcycle includes an exhaust device having certain features, aspects and advantages of the invention.

FIG. 1 is a side view showing the overall structure of a motorcycle 1 having certain features, aspects and advantages of the invention. FIG. 2 to FIG. 7 illustrate the structure of an exhaust device of the motorcycle according to the embodiment shown in FIG. 1. Note that, the present embodiment describes a scooter-type motorcycle as one example of a vehicle of the invention. In the figures, FWD indicates the forward direction in the traveling direction of the motorcycle. The structure of a motorcycle 1 according to the embodiment of the invention is described with reference to FIG. 1 to FIG. 7.

In the motorcycle 1 according to an embodiment of the invention, a main frame 3 is fixed to a lower side of a head pipe 2 as shown in FIG. 1. The main frame 3 is formed to extend from the lower side of the head pipe 2 to the rear. The head pipe 2 and the main frame 3 structure a body frame.

In addition, a handlebar 4 is attached to an upper section of the head pipe 2 such that the handlebar 4 can be turned. Moreover, a front cowl 5 is provided at the front side of the head pipe 2 so as to cover the front side of the head pipe 2. A front fork 6 that includes suspension to absorb impacts imparted on the motorcycle 1 is disposed beneath the head pipe 2 and is coupled to the handlebar 4. A front wheel 7 is rotatably attached to lower ends of the front fork 6. In addition, a front fender 8 is disposed above the front wheel 7.

In addition, a foot rest 9 is disposed on an upper side of a central section of the main frame 3. Furthermore, a seat 10 is disposed on an upper side of a rear section of the main frame 3. Moreover, an engine unit including an engine 11 is disposed beneath the rear section of the main frame 3. A rear wheel 12 is rotatably disposed to the rear side of the engine 11. Furthermore, a rear fender 13 is attached above the rear wheel 12 so as to cover above the rear wheel 12.

The motorcycle 1 includes an exhaust system or exhaust device that receives exhaust gases from the engine 11 and delivers the exhaust gases to an external environment. The exhaust device generally includes an exhaust pipe and a muffler. The exhaust pipe defines an exhaust conduit that receives the exhaust gases from the engine 11 and delivers the exhaust gases to the muffler, which preferably reduces the noise associated with the flow of exhaust gases and releases the exhaust gases to the external environment. The exhaust pipe and/or the muffler may be made up of one or more individual components. Preferably, as described below, a downstream end portion of the exhaust pipe is located within a space defined by the muffler. Specifically, in the illustrated arrangement, one end of an external portion of the exhaust pipe 14 is connected to the engine 11. As described above, the external portion of the exhaust pipe 14 extends towards the rear of the motorcycle 1 and is coupled to a muffler 15 of the exhaust device.

Figure 2:
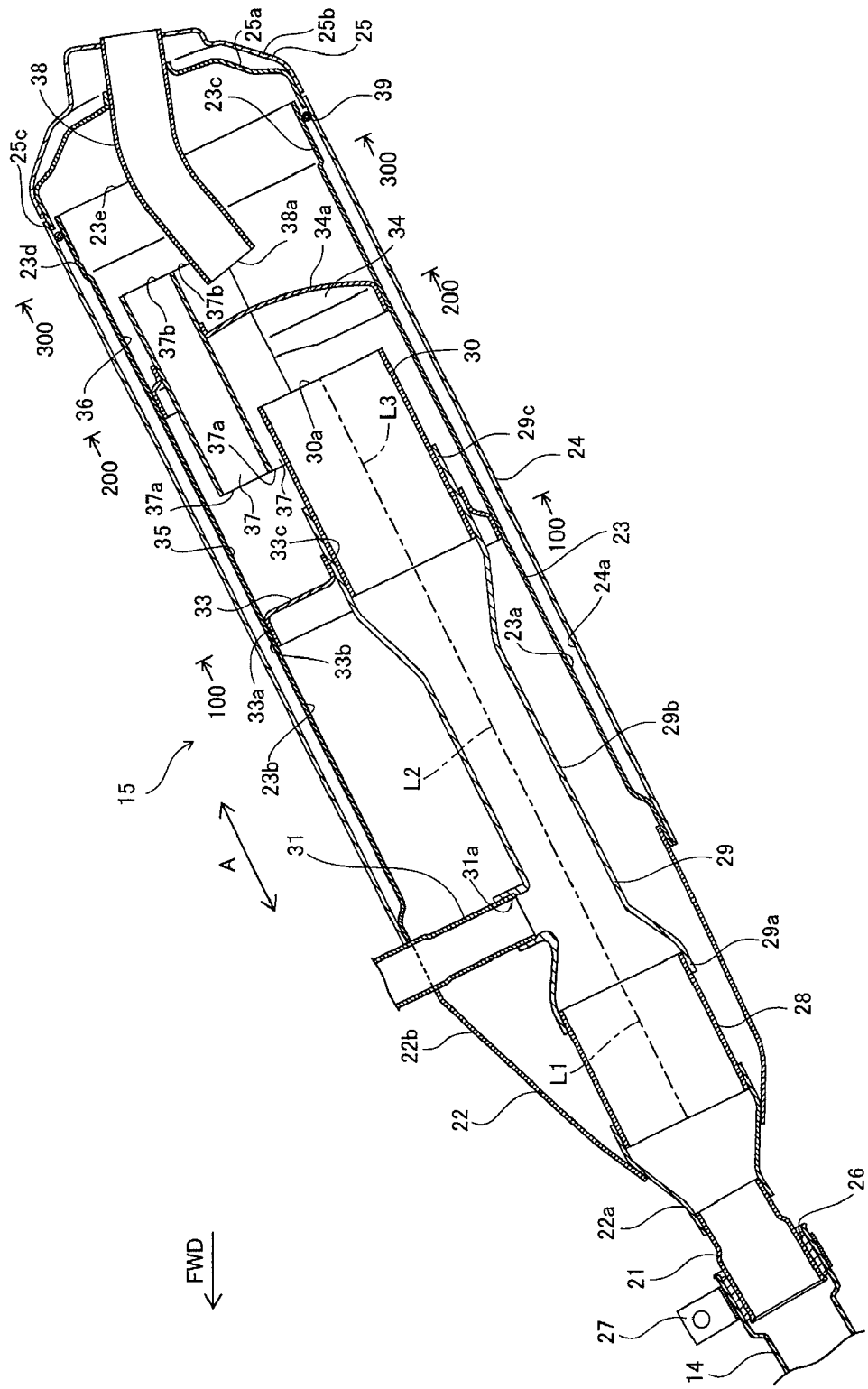
FIG. 2 is a cross sectional view of a rearward portion of the exhaust device of the motorcycle of FIG. 1. The illustrated exhaust device includes an exhaust pipe and a muffler.

The illustrated muffler 15, with reference to FIG. 2, includes a connecting pipe 21 that is connected to the external portion of the exhaust pipe 14, a front side cap member 22 that is made of stainless steel or another suitable material and that is connected to a rear section of the connecting pipe 21, an inner tubular member 23 that is made of stainless steel or another suitable material and that is secured (e.g., welded) to a rear section of the front side cap member 22, an outer tubular member 24, which is secured (e.g., welded) to the inner tubular member 23 at the rear section of the front side cap member 22 and which is made of stainless steel or another suitable material. The outer tubular member 24 includes an inner surface 24a disposed to extend along an outer surface 23a of the inner tubular member 23. The muffler 15 also includes a rear side cap member 25 that is made of stainless steel or another suitable material and that is secured (e.g., welded) to a rear section of the outer tubular member 24. More specifically, a front section of the inner tubular member 23 is fixed to both the front side cap member 22 and the outer tubular member 24, while the rear section of the inner tubular member 23 is not fixed to the outer tubular member 24.

The connecting pipe 21 is connected to the external portion of the exhaust pipe 14 by a fixing member 27 with a seal 26 interposed therebetween. In addition, the front side cap member 22 includes a front member 22a connected to the rear section of the connecting pipe 21, and a front side cap body member 22b that is fixed to the front member 22a. In addition, a purification tube member 28 includes or is formed by a catalyst material that functions to purify exhaust gas and is attached to a rear end section of the front member 22a. Note that, the purification tube member 28 is disposed in the vicinity of an upstream end of the section of the exhaust pipe that is disposed inside the muffler 15, as described below. Furthermore, an air flow pipe 29 having a large diameter section 29a, a smaller diameter section 29b, and a large diameter section 29c is connected to the rear end portion of the purification tube member 28. In addition, a purification tube member 30 including or formed from a catalyst material that functions to purify exhaust gas, forms a portion of the downstream end portion of the exhaust pipe. Preferably, the purification tube member 30 is connected to the rear end portion of the large diameter section 29c of the air flow pipe 29. However, in other arrangements, the purification tube member 30 does not necessarily define the downstream end of the exhaust pipe. More specifically, the purification tube members 28 and 30 are spaced a predetermined distance apart from each other in the longitudinal direction (direction A) of the muffler 15. The purification tube member 28, the air flow pipe 29 and the purification tube member 30 comprise a "purifier" for the exhaust gases. At temperatures equal to or greater than a threshold temperature (an activation temperature) the purifier functions to oxidize HC (hydrocarbon) and CO (carbon monoxide) that remain after combustion of the fuel into $H_2O$ (water) and $CO_2$ (carbon dioxide), and reduce $NO_X$ (nitrogen oxides), as will be appreciated by those of skill in the art.

In addition, the external portion of the exhaust pipe 14, the connecting pipe 21, the front member 22a of the front side cap member 22, the purification tube member 28, the air flow pipe 29, and the purification tube member 30 comprise the "exhaust pipe" in the illustrated arrangement. That is, the purification tube member 30 is located generally at the second or downstream end portion of the exhaust pipe, and the downstream end portion (the purification tube member 30) of the exhaust pipe is located within the muffler 15. The purification tube member 28 is one example of a "second purification member" of the illustrated arrangement, and the purification tube member 30 is one example of a "first purification member" of the illustrated arrangement.

In addition, in the illustrated arrangement, an axis L1 of the purification tube member 28, an axis L2 of the air flow pipe 29, and an axis L3 of the purification tube member 30 are substantially linear. Furthermore, these three axes L1 to L3 are arranged to be coaxial or, together, form a straight line. The axes L1 to L3 are defined by a line connecting the geometric centers of the cross-sections of the particular component. In the illustrated arrangement, the tubes or pipes preferably are generally circular in cross-section and straight or linear in longitudinal shape. Therefore, the axis is a straight line extending along the center point of the tube or pipe. However, in other arrangements, the tube or pipe may have a non-circular cross-sectional shape or be non-linear in longitudinal shape. In such instances, the axis may not necessarily be a straight line, but may be curved.

In addition, one end of a secondary air induction pipe, or air supply pipe 31, for introducing secondary air is connected to the small diameter section 29b of the air flow pipe 29. In this embodiment, an axis (L2) of the section (the small diameter section 29b) of the air flow pipe 29 (the exhaust pipe) connected to the secondary air induction pipe 31 is linear. Furthermore, an axis of the air supply pipe 31 is perpendicular to, or substantially perpendicular to, the axis L2. However, in alternative arrangements, the axis of the air supply pipe 31 may be canted at an angle other than 90 degrees with respect to the axis L2 of the air flow pipe 29. Accordingly, it is possible to prevent the secondary air induction pipe 31 from being attached to the air flow pipe 29 (the exhaust pipe) such that a connection port 31a of the secondary air induction pipe 31 extends toward the upstream side of the exhaust pipe. Moreover, because the portion of the air flow pipe 29 to which the air supply pipe 31 is connected is at least substantially linear, a relatively smooth flow of exhaust gas past the air supply pipe 31 is provided. Thus, the flow of exhaust gas effectively draws air into the air flow pipe 29, through the air supply pipe 31, by a venturi effect. The secondary air induction pipe 31 is one example of an "air supply pipe" of the illustrated embodiment. In addition, taking into consideration the fact that a reduced level of oxygen is supplied to the purification tube member 30 on the rear side as a result of oxygen being consumed in the purification tube member 28 as a result of oxidation that occurs in the purification tube member 28, the secondary air induction pipe 31 is provided to make sure that ample oxygen (air) is supplied to the purification tube member 30.

In addition, the secondary air induction pipe 31 is formed to extend to the outside of the muffler 15 via the connection section of the front side cap member 22, the inner tubular member 23 and the outer tubular member 24. Moreover, as shown in FIG. 1, a housing member 32 that houses a reed valve (or a suitable type of check valve), not shown, is attached to the other end of the secondary air induction pipe 31. In addition, the exhaust pipe, the muffler 15, the secondary air induction pipe 31, and the reed valve housing member 32 are portions of the illustrated exhaust device.

As shown in FIG. 2, a support member 33 that supports the air flow pipe 29 is attached to the large diameter section 29c of the air flow pipe 29. The support member 33 includes a tubular member 33a that extends a relatively short distance in the axial direction (direction A) of the inner tubular member 23. An outer surface 33b of this short tubular member 33a is moveably positioned in aligned with, or parallel to, the inner surface 23b of the inner tubular member 23. When the purifier reaches a sufficiently high temperature, a rear section (the large diameter section 29c of the air flow pipe 29) of the purifier moves rearward in direction A, and along with this the rear section of the inner tubular member 23 moves rearward in direction A. At this time, the outer surface 33b of the short tubular member 33a of the support member 33 moves just slightly along the inner surface 23b of the inner tubular member 23.

Figure 3:
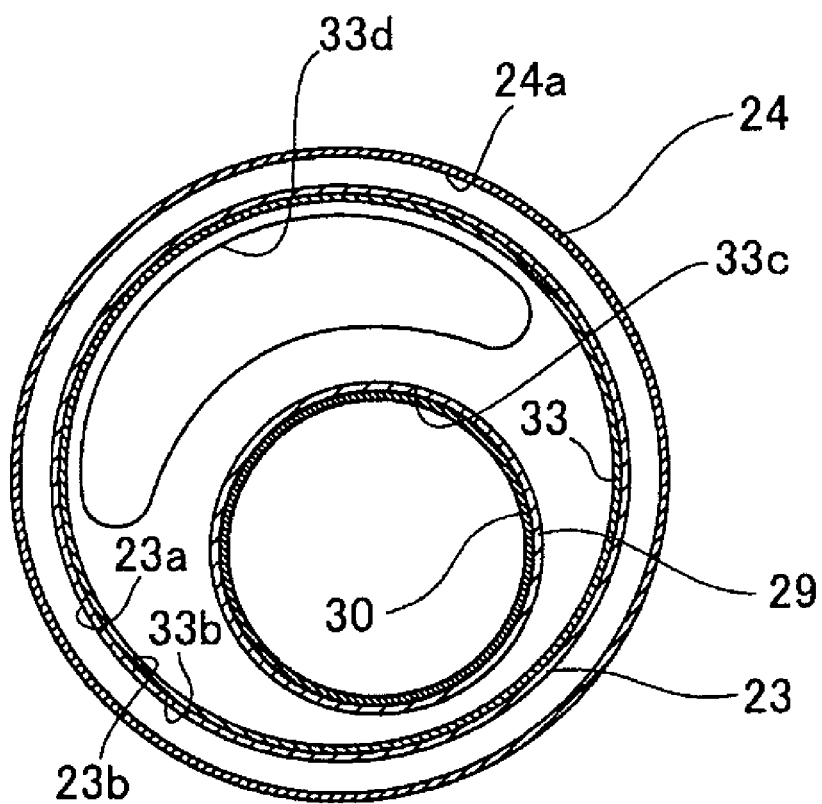
FIG. 3 is a cross sectional view of the exhaust device taken along line 100-100 of FIG. 2.

Furthermore, as shown in FIG. 3, an opening 33d and an insertion hole 33c in which the air flow pipe 29 is inserted are formed in or defined by the support member 33. More specifically, a space that is located to the front side of the support member 33 of the inner tubular member 23 and a space that is located to the rear side of the support member 33 are connected via the opening 33d.

Moreover, as can be seen in FIG. 2, a partition 34 that is fixed to the inner surface 23b of the inner tubular member 23 is disposed to the rear of the purification tube member 30. Furthermore, the front side cap member 22, the inner tubular member 23 and the partition 34 cooperate to define a first expansion chamber 35. In addition, the partition 34, the inner tubular member 23 and the rear side cap member 25 cooperate to define a second expansion chamber 36. More specifically, the partition 34 functions to separate the inside of the muffler 15 into two regions. Note that, the partition 34 is one example of a "separation wall" of the preferred embodiment.

Furthermore, a wall portion 34a formed as a substantially spherical surface is provided in the partition 34. Forming the wall 34a with a spherical surface shape makes it possible to increase the strength of the wall 34a. As a result, even if high pressure exhaust gas that has passed through the purification tube member 30 (the purifier) and into the first expansion chamber 35 expands and generates a large sound, the wall 34a is able to inhibit vibration. As a result, the sound generated by expansion of the exhaust gas is inhibited from being transmitted to the second expansion chamber 36.

Figure 4:
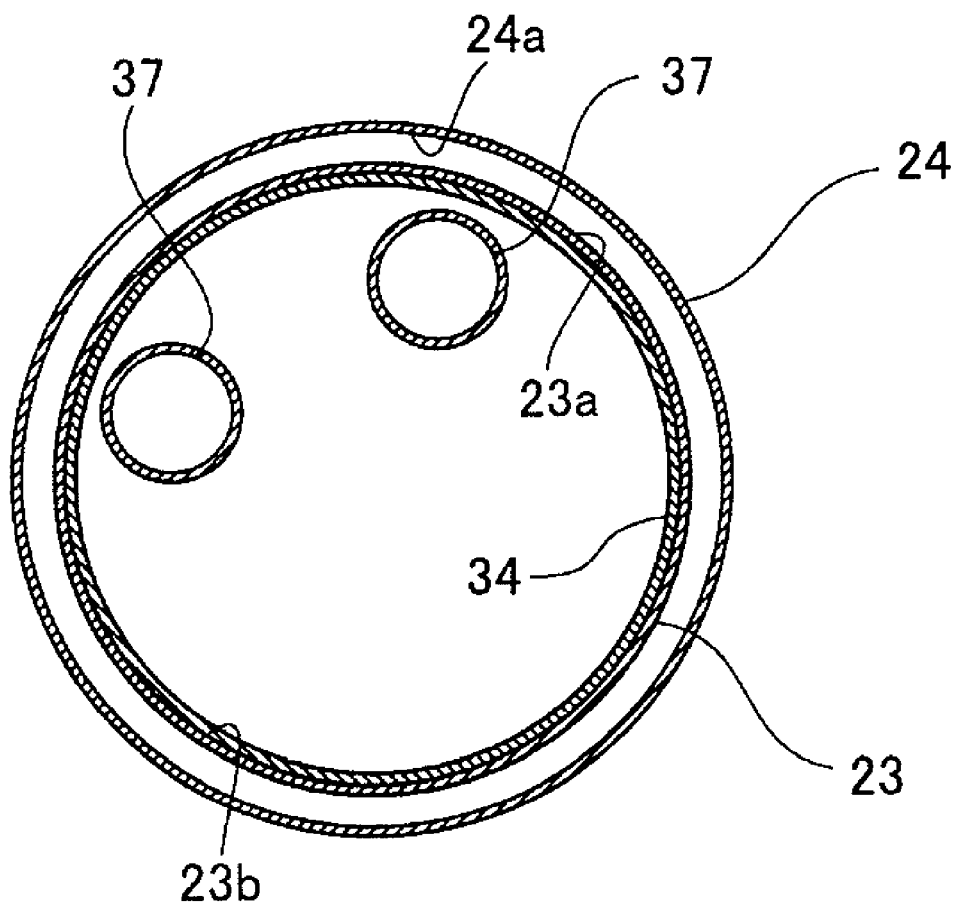
FIG. 4 is a cross sectional view of the exhaust device taken along line 200-200 of FIG. 2.

In addition, as shown in FIG. 2 and FIG. 4, at least one and preferably two connection pipes 37 are attached to the partition 34. Note that, the connection pipes 37 are one example of a "connection pipe" of the preferred embodiment. The connection pipes 37, as shown in FIG. 2, function to connect the first expansion chamber 35 and the second expansion chamber 36, and to allow exhaust gas to pass from the first expansion chamber 35 to the second expansion chamber 36. Furthermore, the connection pipes 37 and the downstream end portion (the purification tube member 30) of the exhaust pipe are arranged to overlap one another in the longitudinal direction (direction A) of the muffler 15. More specifically, a forward opening surface 37a of the connection pipes 37 is disposed further forward in the axial direction (direction A) of the inner tubular member 23 than a rearward opening surface 30a of the purification tube member 30. As a result, the large noise generated when exhaust gas that has passed through the purification tube member 30 expands is inhibited from directly entering into the connection pipes 37, whereby the sounds generated by expansion of the exhaust gas is inhibited from being directly transmitted to the second expansion chamber 36.

Furthermore, a discharge pipe 38 for exhausting exhaust gas that passes through the connection pipes 37 to the outside of the muffler 15 passes through the rear side cap member 25. A forward opening surface 38a of the discharge pipe 38 is disposed further forward in the axial direction (direction A) of the inner tubular member 23 than the rearward opening surface 37b of the connection pipes 37. As a result, the noise generated by expansion of exhaust gas that has passed through the connection pipes 37 is inhibited from directly entering into the discharge pipe 38.

In addition, the discharge pipe 38 is welded to a support member 25a of the rear side cap member 25. Further, a rear side cap body member 25b, which the support member 25a can be secured to, is included in the rear side cap member 25. Moreover, as shown in FIG. 6, a rear end section of the outer tubular member 24 and the rear side cap body member 25b are welded and fixed to the support member 25a of the rear side cap member 25.

Figure 5:
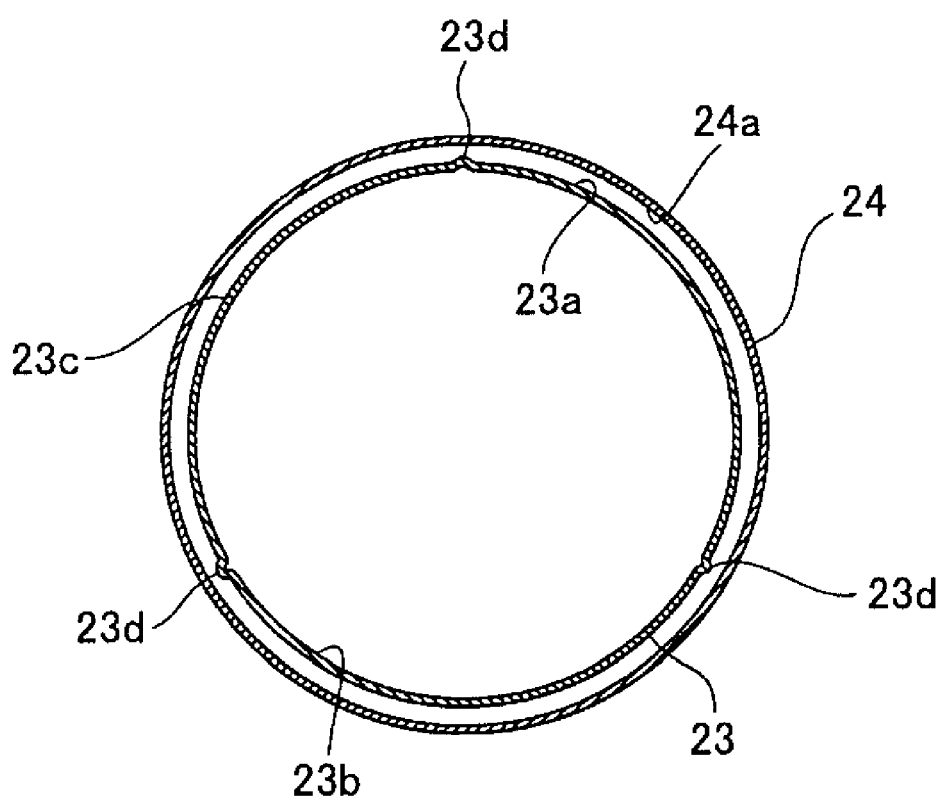
FIG. 5 is a cross sectional view of the exhaust device taken along line 300-300 of FIG. 2.

Moreover, an annular or ring shaped member 39 is disposed between the outer surface 23a of the inner tubular member 23 and the inner surface 24a of the outer tubular member 24. The ring shaped member 39, as shown in FIG. 2 and FIG. 6, is disposed about the outer surface 23a of a rear end section 23c of the inner tubular member 23. Furthermore, as shown in FIG. 5 and FIG. 6, a plurality of, and preferably three, protrusions 23d having a protrusion height H (refer to FIG. 6) that is smaller than an outer diameter D (refer to FIG. 6) of the ring shaped member 39 are formed in a section of the outer surface 23a of the rear end section 23c at positions that are further forward in the axial direction of the inner tubular member 23 and the outer tubular member 24 (direction A in FIG. 6) than the ring shaped member 39. The protrusions 23d are formed in an integrated manner at 120 degrees of separation from each other. However, the protrusions 23d may be separate members attached to the inner tubular member 23 and/or may have other suitable spacing or may be continuous. As a result, the ring shaped member 39 is inhibited from moving further forward than the protrusions 23d of the inner tubular member 23.

Figure 6:
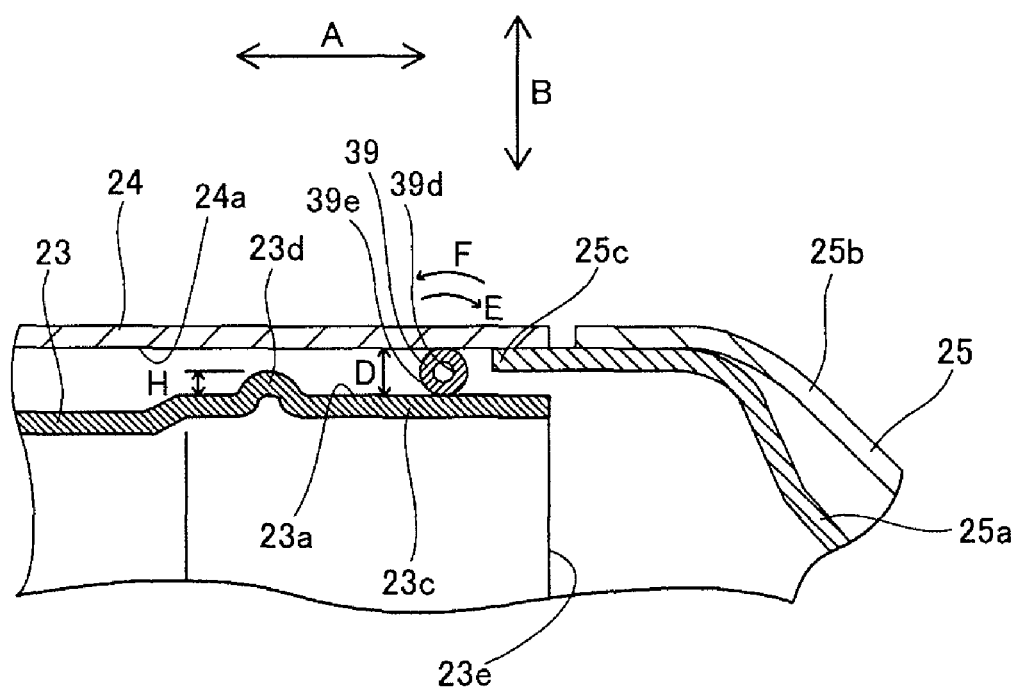
FIG. 6 is a longitudinal cross sectional view of a portion of the exhaust device of FIG. 2 illustrating a ring shaped member positioned between an outer member and an inner member of the muffler.

In addition, as shown in FIG. 6, a front end section 25c of the rear side cap member 25 is disposed rearward of the ring shaped member 39 in the axial direction (direction A) of the inner tubular member 23 and the outer tubular member 24, and at a section that is further to the front side than a rearward opening surface 23e of the inner tubular member 23. As a result, it is possible to inhibit the ring shaped member 39 from moving further to the rear than the front end section 25c of the rear side cap member 25, whereby it is possible to inhibit the ring shaped member 39 from displacing to the rear side of the outer surface 23a of the rear end section 23c of the inner tubular member 23.

Figure 7:
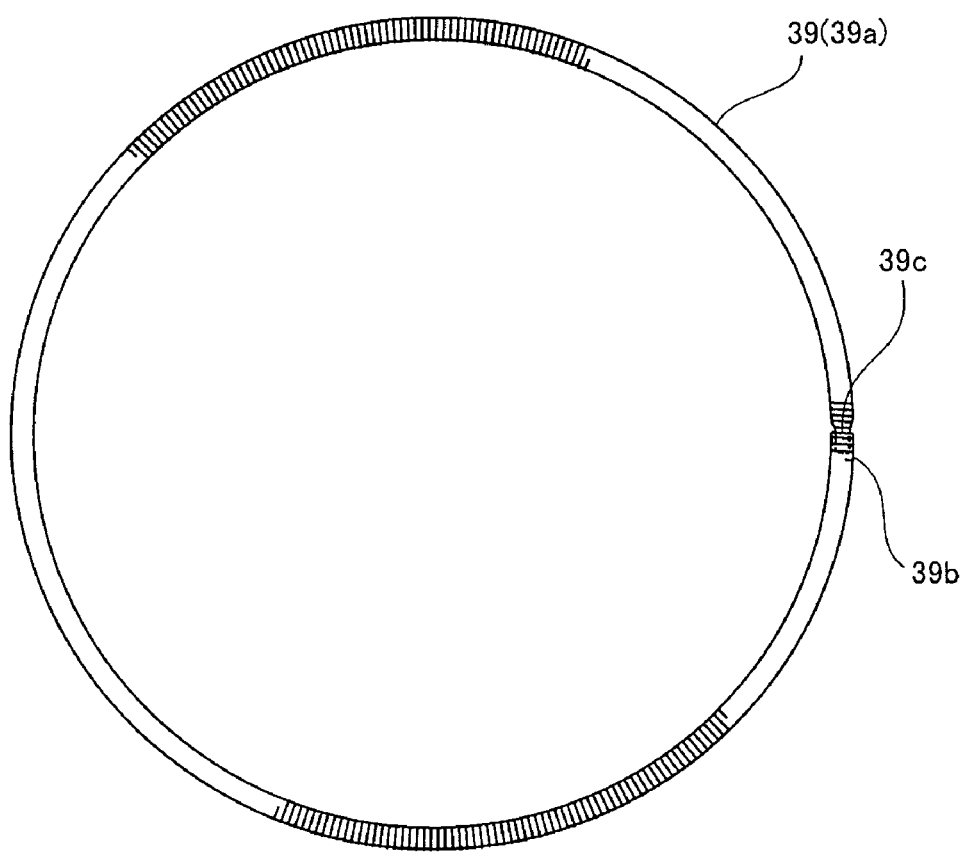
FIG. 7 is a front view showing the structure of the ring shaped member of FIG. 6.

Furthermore, the illustrated ring shaped member 39, with reference to FIG. 7, is formed by shaping a coil member 39a into a ring shape. The coil member 39a is made from an extension coil spring formed by winding a metal wire into a coil shape. More specifically, the coil member 39a includes a first end 39b and a second end 39c and has a cross section that is substantially hollow. As a result of forming the ring shaped member 39 (the coil member 39a) to have a hollow cross section in this manner, the ring shaped member 39 can be elastically deformed in the direction that is perpendicular to the outer surface 23a of the inner tubular member 23 and the inner surface 24a of the outer tubular member 24 (direction B shown in FIG. 6) between the outer surface 23a of the inner tubular member 23 (refer to FIG. 6) and the inner surface 24a of the outer tubular member 24 (refer to FIG. 6).

Furthermore, the first end 39b of the coil member 39a has an external diameter that is the same or substantially the same as the external diameter of a section extending between the first end 39b and the second end 39c of the coil member 39a.

The second end 39c of the coil member 39a has an external diameter that is smaller than the first end 39b. More specifically, the coil member 39a is an extension coil spring that has substantially the same external diameter in which just one end (the second end 39c) has been formed with a smaller external or outer diameter. Furthermore, the second end 39c of the coil member 39a has an external diameter that is the same as, or slightly larger than, the internal or inner diameter of the first end 39b.

Moreover, as shown in FIG. 6, an outer section 39e of the ring shaped member 39, which has a substantially hollow cross section, is generally ring shaped. As a result, when the rear end section 23c of the inner tubular member 23 has moved to the rear side cap member 25 side (the rear side) as a result of the inner tubular member 23 expanding at high temperatures, the ring shaped member 39 can move while rotating in direction E or direction F with respect to the outer surface 23a of the inner tubular member 23 and the inner periphery surface 24a of the outer tubular member 24.

In such an arrangement, as described above, as a result of the axis of the section of the air flow pipe 29 (the exhaust pipe) connected to the secondary air induction pipe 31 being a straight line, it is possible to prevent the secondary air induction pipe 31 from being attached to the exhaust pipe (the air flow pipe 29) such that the connection port 31a of the secondary air induction pipe 31 extends in a direction towards the upstream side of the exhaust pipe. As a result, when exhaust gas passes from the upstream side to the downstream side inside the exhaust pipe (the air flow pipe 29), the exhaust gas is inhibited from flowing into the connection port 31a of the secondary air induction pipe 31. Accordingly, when the exhaust gas passes from the upstream side to the downstream side within the exhaust pipe, negative pressure is likely to be generated in the connection port 31a of the secondary air induction pipe 31, whereby air is more easily able to flow from the secondary air induction pipe 31 to the exhaust pipe (the air flow pipe 29). As a result, it is possible to inhibit the hindrance of the supply of air from the secondary air induction pipe 31 to the exhaust pipe (the air flow pipe 29).

Furthermore, in the illustrated arrangement, the purification tube member 28 for purifying exhaust gas is provided upstream of the portion of the exhaust pipe to which the secondary air induction pipe 31 is connected, and the purification tube member 30 is provided in the downstream end portion of the exhaust pipe. As a result, the exhaust gas can be purified by the purification tube members 28 and 30, whereby the purification capability of the exhaust device is improved.

Furthermore, the axis L1 of the purification tube member 28, the axis L2 of the air flow pipe 29, and the axis L3 of the purification tube member 30 are arranged in a linear manner. Accordingly, as compared to a structure in which the axis L1 of the purification tube member 28, the axis L2 of the air flow pipe 29, and the axis L3 of the purification tube member 30 are arranged in a curved manner, the flow rate of the exhaust gas inside the purification tube member 28, the air flow pipe 29 and the purification tube member 30 of the exhaust pipe is inhibited from being reduced. As a result, exhaust gas pressure inside the purification tube member 28, the air flow pipe 29 and the purification tube member 30 of the exhaust pipe is inhibited from being increased. Accordingly, it is possible to inhibit the hindrance of the supply of air from the secondary air induction pipe 31 to the exhaust pipe (the air flow pipe 29).

Moreover, in the illustrated arrangement, the purification tube member 28 is located within the muffler 15. As a result, it is possible to inhibit the purification tube member 28 from being cooled by the outside atmosphere, whereby it is possible to reduce the time required to raise the temperature of the purification tube member 28 to the temperature at which the exhaust gas is effectively purified (the activation temperature).

Furthermore, in the illustrated arrangement, the purification tube member 28 is disposed in the vicinity of the upstream end of the portion of the exhaust pipe located within the muffler 15. As a result, the purification tube member 28 is disposed close to the engine 11. Accordingly, exhaust gas with a higher temperature is able to flow into the purification tube member 28, whereby it is possible to reduce the time required to raise the temperature of the purification tube member 28 to the temperature at which the exhaust gas is effectively purified (the activation temperature).

In addition, in this embodiment, the purification tube members 28 and 30 are arranged to be a predetermined distance apart from each other in the longitudinal direction (direction A) of the muffler 15. As a result, the purification tube members 28 and 30 are not disposed in a row in the direction (the lateral direction) that crosses the longitudinal direction of the muffler 15. Accordingly, the muffler 15 does not need to be made larger in the direction (the lateral direction) that is generally perpendicular to the longitudinal direction of the muffler 15.

Furthermore, in the illustrated arrangement, the purification tube member 30 (the downstream end portion of the exhaust pipe) and the connection pipes 37 are arranged so as to overlap with one another in the longitudinal direction (direction A) of the muffler 15. As a result, the purification tube member 30 (the downstream end portion of the exhaust pipe) is disposed away from the secondary air induction pipe 31 in the longitudinal direction of the muffler 15. Accordingly, heat generated by purification of the exhaust gas by the purification tube member 30 is inhibited from being transmitted to the section of the air flow pipe 29 (the exhaust pipe) where the secondary air induction pipe 31 is connected. As a result, the pressure of the air at the section of the air flow pipe 29 (the exhaust pipe) where the secondary air induction pipe 31 is connected is inhibited from being increased by heat generated by the purification tube member 30. Therefore, a hindrance of the flow of air from the secondary air induction pipe 31 into the air flow pipe 29 (the exhaust pipe) is inhibited even more effectively. Moreover, as a result of arranging the purification tube member 30 (the downstream end portion of the exhaust pipe) and the connection pipes 37 such that they overlap in the longitudinal direction of the muffler 15, sound generated by expansion of exhaust gas, when the exhaust gas that has passed through the purification tube member 30 (the downstream end portion of the exhaust pipe) expands in the first expansion chamber 35, is inhibited from directly entering the connection pipes 37. As a result, it is possible to inhibit sound generated by expansion of the exhaust gas from being transmitted to the second expansion chamber 36.

In the arrangement described herein, all of the described features are exemplary, and thus are not intended to limit the invention. The scope of the invention is defined by the claims and not by the description of the above-described arrangements. In addition, the invention includes structures that are equivalent to the scope of the claims and all modifications that come within the scope of the claims.

For example, in the above-described arrangement, a motorcycle is described as one example of a vehicle provided with the exhaust device. However, the invention is not limited to a motorcycle, and so long as a vehicle is provided with the exhaust device, the invention may be applied to other vehicles such as an automobile, a three-wheel vehicle, an ATV (All Terrain Vehicle) or the like.

In addition, the above-described embodiment describes an example in which the exhaust device is applied to a vehicle. However, the invention is not limited to this, and the exhaust device may be applied to devices other than those used in a vehicle.

Furthermore, the above-described embodiment explains an example in which the overall axis of the air flow pipe with the connected secondary air induction pipe is arranged to be linear. However, the invention is not limited to such a structure, and in some non-limiting embodiments, only the axis of the section of the air flow pipe to which the secondary air induction pipe is connected may be linear or substantially linear.

In addition, the above-described arrangement is an example in which the axes (L1, L3) of the purification tube members and the axis (L2) of the air flow pipe are arranged to be linear. However, the invention is not limited to such a structure and the axes (L1, L3) of the purification tube members and the axis (L2) of the air flow pipe may be arranged in a non-linear manner. In this case, for example, the air flow pipe may be formed to have a bent shape, and a structure may be adopted in which the flow direction of the exhaust gas that passes through the upstream side purification tube member and the flow direction of the exhaust gas that passes through the downstream side purification tube member are opposite to each other.

Furthermore, the above-described arrangement is an example in which the purification tube members are respectively provided upstream of the portion of the exhaust pipe to which the secondary air induction pipe is connected, and in the downstream end portion of the exhaust pipe. However, the invention is not limited to such an arrangement and a structure may be adopted in which no purification tube member is provided upstream of the portion of the exhaust pipe to which the secondary air induction pipe is connected, and a purification tube member is just provided in the downstream portion of the exhaust pipe.

Moreover, the above-described arrangement places the purification tube member upstream from the secondary air induction pipe within the muffler. However, the invention is not limited to such a structure, and the purification tube member upstream from the secondary air induction pipe may be disposed outside of the muffler. In other words, the purification tube member may be provided in a portion of the exhaust pipe external of the muffler.

In addition, the above-described arrangement provides an example in which a single partition member is provided to separate the inside of the muffler into two expansion chambers (the first expansion chamber and the second expansion chamber). However, the invention is not limited to such an arrangement, and two or more partition members may be provided and the inside of the muffler may be separated into three or more expansion chambers.

Furthermore, the above-described arrangement provides an example in which the first expansion chamber is located to forward of the second expansion chamber. However, the invention is not limited to this arrangement and the first expansion chamber may be located to rearward of the second expansion chamber.

Although this invention has been disclosed in the context of a certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combine with or substituted for one another in order to form varying modes of the disclosed invention. Thus, it is intended that the scope of the present invention herein disclosed should not be limited by the particular disclosed embodiments described above, but should be determined only by a fair reading of the claims.

What is claimed is:

1. An exhaust device for a vehicle, the exhaust device comprising:
    an exhaust pipe, the exhaust pipe including a first end portion and a second end portion, the first end portion of the exhaust pipe is arranged to be connected to an engine;
    a muffler, wherein the second end portion of the exhaust pipe is located within the muffler;
    an air supply pipe arranged to supply air to the exhaust pipe, the air supply pipe is connected to a portion of the exhaust pipe located within the muffler, wherein at least the portion of the exhaust pipe to which the air supply pipe is connected is substantially linear such that a smooth flow of exhaust gas past the air supply pipe is provided;
    a first purification member arranged to purify exhaust gas, the first purification member being located at a downstream most end of the second end portion of the exhaust pipe such that no portion of the exhaust pipe or any other exhaust pipe disposed within the muffler and connected to the first purification member extends downstream from the first purification member;
    a second purification member arranged to purify exhaust gas, wherein the second purification member is located upstream of the portion of the exhaust pipe to which the air supply pipe is connected; and
    a separation wall arranged to separate a space inside the muffler into a plurality of expansion chambers, the separation wall arranged to face the second end portion of the exhaust pipe and to separate a first expansion chamber of the plurality of expansion chambers from a second expansion chamber of the plurality of expansion chambers, the second expansion chamber being located on an opposite side of the separation wall from the second end portion of the exhaust pipe; wherein
    the first purification member and the second purification member are arranged in line within the muffler such that a longitudinal axis of the first purification member is substantially linear with a longitudinal axis of the second purification member; and
    a connection pipe extends through the separation wall and connects the first and second expansion chambers separated by the separation wall such that an upstream end of the connection pipe opens into the first expansion chamber and a downstream end of the connection pipe opens into the second expansion chamber, and the second end portion of the exhaust pipe and the connection pipe overlap one another in a longitudinal direction of the muffler.

2. The exhaust device of claim 1, wherein the exhaust pipe is substantially linear between the portion to which the air supply pipe is connected and the first purification member.

3. The exhaust device of claim 1, wherein an axis of the air supply pipe is substantially perpendicular to an axis of the portion of the exhaust pipe to which the air supply pipe is connected.

4. The exhaust device of claim 1, wherein the separation wall has a substantially spherical surface.

5. The exhaust device of claim 1, wherein each of the first purification member and the second purification member includes a catalyst arranged to purify exhaust gas.

6. The exhaust device of claim 5, wherein the exhaust pipe is substantially linear between the first purification member and the second purification member.

7. The exhaust device of claim 1, wherein the second purification member is located within the muffler.

8. The exhaust device of claim 7, wherein the second purification member is positioned adjacent an upstream end of a section of the exhaust pipe that is located within the muffler.

9. The exhaust device of claim 7, wherein the first purification member and the second purification member are spaced at a predetermined distance apart from one another in a longitudinal direction of the muffler.

10. A vehicle comprising:
an engine;
an exhaust pipe, the exhaust pipe including a first end portion and a second end portion, the first end portion of the exhaust pipe configured to receive exhaust gases from the engine;
a muffler, wherein the second end portion of the exhaust pipe is located within the muffler;
an air supply pipe arranged to supply air to the exhaust pipe, the air supply pipe is connected to a portion of the exhaust pipe located within the muffler, wherein at least the portion of the exhaust pipe to which the air supply pipe is connected is substantially linear such that a smooth flow of exhaust gas past the air supply pipe is provided;
a first purification member arranged to purify exhaust gas, the first purification member being located at a downstream most end of the second end portion of the exhaust pipe such that no portion of the exhaust pipe or any other exhaust pipe disposed within the muffler and connected to the first purification member extends downstream from the first purification member; and
a second purification member arranged to purify exhaust gas, wherein the second purification member is located upstream of the portion of the exhaust pipe to which the air supply pipe is connected; and
a separation wall arranged to separate a space inside the muffler into a plurality of expansion chambers, the separation wall arranged to face the second end portion of the exhaust pipe and to separate a first expansion chamber of the plurality of expansion chambers from a second expansion chamber of the plurality of expansion chambers, the second expansion chamber being located on an opposite side of the separation wall from the second end portion of the exhaust pipe; wherein
the first purification member and the second purification member are arranged in line within the muffler such that a longitudinal axis of the first purification member is substantially linear with a longitudinal axis of the second purification member; and
a connection pipe extends through the separation wall and connects the first and second expansion chambers separated by the separation wall such that an upstream end of the connection pipe opens into the first expansion chamber and a downstream end of the connection pipe opens into the second expansion chamber, and the second end portion of the exhaust pipe and the connection pipe overlap one another in a longitudinal direction of the muffler.

11. The vehicle of claim 10, wherein the exhaust pipe is substantially linear between the portion to which the air supply pipe is connected and the first purification member.

12. The vehicle of claim 10, wherein an axis of the air supply pipe is substantially perpendicular to an axis of the portion of the exhaust pipe to which the air supply pipe is connected.

13. The vehicle of claim 10, wherein the separation wall has a substantially spherical surface.

14. The vehicle of claim 10, wherein each of the first purification member and the second purification member includes a catalyst that functions to purify exhaust gas.

15. The vehicle of claim 14, wherein the exhaust pipe is substantially linear between the first purification member and the second purification member.

16. The vehicle of claim 10, wherein the second purification member is located within the muffler.

17. The vehicle of claim 16, wherein the second purification member is positioned adjacent an upstream end of a section of the exhaust pipe that is located within the muffler.

18. The vehicle of claim 16, wherein the first purification member and the second purification member are spaced at a predetermined distance apart from one another in a longitudinal direction of the muffler.

* * * * *